United States Patent [19]

De Munck et al.

[11] Patent Number: 4,988,565
[45] Date of Patent: Jan. 29, 1991

[54] POLYMER MIXTURE COMPRISING A POLYPHENYLENE ETHER, A BLOCK COPOLYMER, A PHOSPHATE ESTER AND ADDITIVES

[75] Inventors: Johannes W. J. De Munck, Huybergen; Johannes H. G. M. Lohmeijer, Hoogerheide, both of Netherlands

[73] Assignee: GE Plastics, Selkirk, N.Y.

[21] Appl. No.: 422,824

[22] Filed: Oct. 17, 1989

Related U.S. Application Data

[62] Division of Ser. No. 26,593, Mar. 17, 1987.

[30] Foreign Application Priority Data

Mar. 17, 1986 [NL] Netherlands ......................... 8600670

[51] Int. Cl.⁵ ......................... C08L 71/12; D03G 3/00
[52] U.S. Cl. ..................................... 428/373; 428/928; 428/929
[58] Field of Search ........................ 428/373; 524/142; 525/905, 92

[56] References Cited

U.S. PATENT DOCUMENTS 3,383,436  5/1968  Czek ..................................... 525/905
4,154,712  5/1970  Lee, Jr. ............................... 524/142

*Primary Examiner*—Jacob Ziegler
*Attorney, Agent, or Firm*—Francis T. Coppa

[57] ABSTRACT

The invention relates to a polymer mixture which comprises a polyphenylene ether, a block copolymer, and a phosphate ester in a given ratio by weight. The polymer mixture according to the invention is particularly suitable as a material for cable sheaths.

10 Claims, No Drawings

POLYMER MIXTURE COMPRISING A POLYPHENYLENE ETHER, A BLOCK COPOLYMER, A PHOSPHATE ESTER AND ADDITIVES

This is a divisional of application Ser. No. 026,593, filed Mar. 17, 1987.

The invention relates to a polymer mixture which comprises a polyphenylene ether, a block copolymer, a phosphate ester and additives.

The invention relates to a polymer mixture which may be used as a cable sheath material. Materials suitable for cable sheaths must be readily extrusible (for them to be provided as a sheath by extrusion), may be combustible only to a limited extent, and must be flexible.

British Patent Specification No. 1,591,137 discloses polymer mixtures which comprise a polyphenylene ether, a block copolymer, and an aromatic phosphate. These known polymer mixtures comprise 60–99 parts by weight of polyphenylene ether, 40–1 parts by weight of block copolymer, and 1–40 parts by weight of aromatic phosphate. The known polymer mixtures are formed to articles by injection molding. The polymer mixtures have good fire-retarding properties, a good impact strength, and the articles formed therefrom have a shining surface. The known polymer mixtures are too rigid for use as a cable sheath.

No. EP-A-124 916 discloses polymer mixtures which comprise 50–70 by weight of polyphenylene ether, 25–45 parts by weight of block copolymer, 10–20 parts by weight of phosphate compound, 2–10 parts by weight of mineral oil, and 0–10 parts by weight of additives. These polymer mixtures are suitable to form therefrom a wire envelope by means of wire sheath extrusion. The fire-retarding properties and the flexibility of these polymer mixtures are satisfactory for a wire envelope. For a cable envelope a material having better fireretarding properties and a greater flexibility is required.

No. EP-A-0135124 discloses flame retardant mixtures of a polyphenylene ether resin, an alkenylaromatic elastomer, an organic phosphate flame retardant and a crosslinking agent. Said mixtures are curable by heating or by exposure to high energy. Said mixtures can be used for the insulation of electrical wires and cables. The mixtures specifically disclosed comprise 10–12% by weight of phosphate, 30–37% by weight of polyphenylene ether, the remainder being mainly an elastomeric component.

The invention provides polymer mixtures which are suitable as a material for cable sheaths. The polymer mixture according to the invention is characterized in that the polymer mixture consists of the following constituents:
 30–40% by weight of polyphenylene ether;
 30–40% by weight of block copolymer;
 20–35% by weight of phosphate ester, and
 0–5% by weight of additives,
the sum of the said constituents being 100% by weight, wherein the mixture does not comprise a crosslinking agent.

The weight ratio of polyphenylene ether to phosphate ester preferably is smaller than 1.65 to 1.

The invention is based on the discovery that, by choosing the quantities of the said constituents within the indicated limits, the desired combination of properties for cable sheath materials can be obtained.

When less than 30% by weight of polyphenylene ether is used, a polymer mixture is obtained which has unsatisfactory self-extinguishing properties, while the use of more than 40% by weight results in too high a rigidity and too low a flexibility.

The quantity of block copolymer is chosen between 30 and 40% by weight. A quantity of less than 30% by weight provides too little flexibility. A quantity of more than 40% by weight leads to too small selfextinguishing properties.

The phosphate ester is used in a quantity from 20–35% by weight. Polymer mixtures having less than 20% by weight have unsatisfactory fire-retarding properties. Polymer mixtures having more than 35% by weight plastisize already at room temperature.

The polymer mixtures according to the invention may comprise 0–5% by weight of additives. The use of more than 5% by weight results in disturbance of the desired properties for cable sheaths.

The polymer mixture according to the invention comprises the following constituents:
 A. one or more polyphenylene ethers;
 B. one or more block copolymers;
 C. one or more phosphate esters, and
 D. additives.

A. Polyphenylene ethers

Polyphenylene ethers (also known as polyphenylene oxides) as used in the invention are a group of polymers which are known per se. They are used in industry on a wide scale, in particular as technical synthetic resins in applications where ductility and thermal resistance are required. Since their discovery, numerous variations and modifications have been found which are all suitable for use in the present invention, including, but not restricted to, those described hereinafter.

Polyphenylene ethers comprise a number of units of the formula:

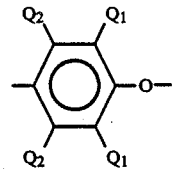

(1)

In each of these units, independently of each other, each $Q_1$ is a primary or secondary lower alkyl (i.e. alkyl with not more than seven carbon atoms), phenyl, aminoalkyl or hydrocarbonoxy; and each $Q_2$ is independent hydrogen, primary or secondary lower alkyl, phenyl and/or hydrocarbonoxy. Examples of suitable primary lower alkyl groups are methyl, ethyl, n-propyl, n-butyl, isobutyl, n-amyl, isoamyl, 2-methyl-butyl, n-hexyl, 2,3-dimethylbutyl, 2-,3- or 4-methylpentyl and the corresponding heptyl groups. Examples of secondary lower alkyl groups are isopropyl, sec-butyl and 3-pentyl. Alkyl radicals, if any, are preferably straight instead of branched. Each $Q_1$ often is an alkyl or phenyl, in particular a $C_{1-4}$ alkyl, and each $Q_2$ often is a hydrogen. Suitable polyphenylene ethers are described in a great number of Patents.

Both homopolymeric and copolymeric polyphenylene ethers are suitable. Suitable homopolymers are, for example, those with 2,6-dimethyl-1,4-phenylene ether units. Suitable copolymers include random copolymers which comprise such units in combination with (for example) 2,3,6-trimethyl-1,4-phenylene ether units. Many suitable random copolymers and homopolymers have been described in the patent literature.

Polyphenylene ethers which change the properties such as the molecular weight, the melt viscosity and/or the impact strength are also suitable. Such polymers are described in the patent literature and may be prepared by grafting vinyl monomers such as acrylonitrile and vinylaromatic compounds (for example, styrene) or polymers such as polystyrenes and elastomers on the polyphenylene ether in known manner. The product usually comprises both grafted and non-grafted units. Further suitable polymers are the coupled polyphenylene ethers in which the coupling agent is reacted in known manner with the hydroxy groups of two polyphenylene ether chains while forming a polymer with higher molecular weight which comprises the reaction product of the hydroxy groups and the coupling agent. Examples of suitable coupling agents are polycarbonates with low molecular weight, quinone compounds, heterocyclic compounds and formal compounds.

Polyphenylene ethers usually have a number-averaged molecular weight between approximately 3,000 and 40,000 and a weight-averaged molecular weight between approximately 20,000 and 60,000 as determined by means of gel permeation chromatography. In most of the cases the intrinsic viscosity is between approximately 0.35 and 0.7 dl/g measured in chloroform at 25% C.

Polyphenylene ethers are usually prepared by the oxidative coupling of at least a corresponding hydroxyaromatic compound. Particularly suitable and easily obtainable hydroxyaromatic compounds are 2,6-xylenol (in which each $Q_1$ is a methyl and each $Q_2$ a hydrogen), in which the resulting polymer may be indicated as a poly(2,6-dimethyl-1,4 phenylene ether) and 2,3,6-trimethylphenol (in which each $Q_1$ and one $Q_2$ is methyl and the other $Q_2$ is hydrogen).

A number of catalyst systems are known for the preparation of polyphenylene ethers by oxidative coupling. There are no restrictions as regards the choice of the catalyst and any of the known catalysts may be used. They usually comprise at least a heavy metal compound such as a copper, manganese or cobalt compound, usually in combination with various other materials.

A first group of catalyst systems preferably to be used consists of those which comprise a copper compound. Such catalysts are described, for example, in U.S. Pat. Nos. 3,306,874; 3,306,875; 3,914,266 and 4,028,341. They usually consist of combinations of monovalent and bivalent copper ions, halogen (i.e. chloride, bromide or iodide) ions and at least one amine.

Catalyst systems which comprise manganese compounds form a second group which is preferably to be used. They usually consist of alkaline systems in which bivalent manganese has been combined with anions such as halide, alkoxide or phenoxide. The manganese is in most of the cases present in the form of a complex with one or more complex-forming agents and/or chelating agents, such as dialkylamines, alkanolamines, alkylene diamines, o-hydroxyaromatic aldehydes, o-hydroxyazo compounds, alpha-hydroxyamines (monomeric and polymeric), o-hydroxyaryloximes and beta-diketones. Also suitable are the known cobalt-containing catalyst systems. Suitable manganese and cobalt-containing catalyst systems for the preparation of polyphenylene ethers are known by their description in numerous Patents and publications.

The polyphenylene ethers usually comprise terminal groups which depend on the catalyst systems used and the reaction conditions used.

B. Block copolymers

Vinylaromatic diene diblock copolymers or vinylaromatic diene vinylaromatic triblock copolymers are used as block copolymers in the polymer mixtures according to the invention. These block copolymers may be selectively hydrogenated. The structure of the triblock copolymers may be linear or also radial. Particularly suitable are the commercially available partially hydrogenated, linear styrene-butadiene-styrene triblock copolymers. It is possible to replace up to 50% by weight of the quantity of block copolymer to be used by polyolefins, such as PE and PP, or preferably by EDPM.

C. Phosphate esters

As a phosphate ester the polymer mixture according to the invention comprises at least a compound of the general formula

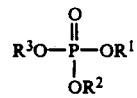

wherein $R^1$, $R^2$, $R^3$ may be equal to or different from each other and each represent an alkyl group, cycloalkyl group, aryl group, alkaryl group, aralkyl group or a hydrogen atom, of which at least one of the groups $R^1$, $R^2$, $R^3$ represents an aromatic group. Examples of suitable phosphates are triphenyl phosphate, diphenylcresyl phosphate, and cumyl-diphenyl phosphate.

D. Additives

The polymer mixture according to the invention may comprise one or more additives as they are generally used in polymer mixtures which comprise a polyphenylene ether. Examples of such additives are mold-release agents, stabilizers, pigments and dyes, reinforcing or non-reinforcing fillers, polyolefins, antidrip additions, processing aids (mineral oil, wax, and the like).

The polymer mixture according to the invention presents the advantage that it does not comprise halogens. Therefore, aggressive-halogens-containing gases cannot be released in the case of a fire.

The polymer mixture according to the invention can be obtained according to methods conventionally used for the preparation of polymer mixtures. The said constituents are preferably mixed and extruded in an extruder. The resulting extrudate is then chopped up. The resulting pieces (pellets) may then be extruded—in a device for sheath extrusion—around a core of one or more wires while forming a cable sheath.

The invention will now be described in greater detail with reference to the ensuing specific examples.

EXAMPLES I and II.

Two different polymer mixtures according to the invention were prepared having a composition as indicated in the table hereinafter. A poly(2,6-dimethyl-phenylene ether) having an intrinsic viscosity of 49 ml/g measured in chloroform at 25° C. was used as a polyphenylene ether; a mixture of triphenyl phosphate and triisopropylphenyl phosphate (weight ratio 10:1) was used as a phosphate ester; a partially hydrogenated, linear styrene-butadiene-styrene triblock copolymer was used as a block copolymer.

The said constituents and a small quantity of titanium dioxide were mixed and formed into pellets in an extruder. Standardized test pieces were formed from the pellets to determine the properties stated hereinafter in the table.

TABLE

| Example | I | II |
|---|---|---|
| Composition (parts by weight) | | |
| polyphenylene ether | 33 | 40 |
| block copolymer | 35 | 35 |
| phosphate ester | 32 | 25 |
| TiO$_2$ | 2 | 2 |
| Properties | | |
| Izod impact strength with notch ASTM D 256 (J/m) | 400 | 550 |
| heat distortion temperature 1.82 N/mm$^2$, ASTM D 648 (°C.) | 20 | 45 |
| melt viscosity Pa · s | 125(at 200° C.) | 225(at 220° C.) |
| yield strength MPA | 10 | 18 |
| elongation at rupture % | 163 | 138 |
| UL* 94 1.6 mm | VO | VI |
| LOI** % | above 36 | above 36 |
| surface at 220° C. extruded ribbon | good | good |

*UL 94: is a known test to determine the fire-retarding properties of synthetic resins. VO best evaluation; V2 worst evaluation.
**LOI: Limiting Oxygen Index, i.e. the minimum content of oxygen in a mixture of oxygen/nitrogen, at which the test piece can be set on fire by means of a flame.

On the basis of their great elongation and low strength, the polymer mixtures according to the invention are very flexible. The favorable value for the melt viscosity and the test in which a ribbon was extruded demonstrate that the polymer mixtures according to the invention are readily extrusible. The UL 94 values and in particular the surprisingly good LOI values demonstrate that the polymer mixtures according to the invention have satisfactory properties for cable sheaths.

Cable sheathing tests have also been carried out with these polymer mixtures in which very good processing properties were demonstrated, for example, high production rate, good cable quality, such as good mechanical rigidity, good surface and the passing of the VDE NORM 0472, "Teil 804, Prüfart B" as self-extinction test for cable materials. Extrusion as carried out on existing PVC extruders without the need of machine modifications at temperatures from 200° to 220° C.

What is claimed is:

1. A cable which includes a sheath formed of a polymer mixture which comprises:
   (a) 30% by weight to 40% by weight polyphenylene ether resin;
   (b) 30% by weight to 40% by weight block copolymer; and
   (c) 20% by weight to 35% by weight phosphate ester, the sum of said constituents being 100% by weight, wherein the mixture does not comprise a crosslinking agent.

2. The cable of claim 1, characterized in that the weight ratio of the polyphenylene ether to the phosphate ester in the polymer mixture is smaller than 1.65 to 1.

3. The cable of claim 1, wherein component (b) of the polymer mixture is a partially hydrogenated styrene-butadiene-styrene triblock copolymer.

4. The cable of claim 1, wherein component (c) of the polymer mixture is a compound of the formula

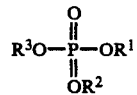

wherein $R^1$, $R^2$, and $R^3$ may be equal to or different from each other, and each represents an alkyl group, cycloalkyl group, aryl group, alkaryl group, aralkyl group, or a hydrogen atom, of which at least one of $R^1$, $R^2$, and $R^3$ is an aromatic group.

5. The cable of claim 1, wherein up to one-half, by weight, of the block copolymer present in the polymer mixture is replaced by polyolefin resin.

6. The cable of claim 5, wherein the polyolefin resin in the polymer mixture is selected from the group consisting of polyethylene, polypropylene, EPDM, and mixtures of the foregoing.

7. A polymer mixture comprising the following:
   (a) 30% by weight to 40% by weight polyphenylene ether resin;
   (b) 30% by weight to 40% by weight block copolymer;
   (c) 20% by weight to 35% by weight phosphate ester; and
   (d) polyolefin resin, present in an amount which replaces up to one-half, by weight, of the block copolymer of component (b);
   wherein the mixture does not comprise a crosslinking agent.

8. The polymer mixture of claim 7 wherein the polyolefin of component (d) is selected from the group consisting of polyethylene, polypropylene, EPDM, and mixtures of the foregoing.

9. The cable of claim 1, wherein the polyphenylene ether resin has an intrinsic viscosity between approximately 0.35 and 0.7 dl/g, as measured in chloroform at 25 degrees Centigrade.

10. The polymer mixture of claim 7, wherein the polyphenylene ether resin has an intrinsic viscosity between approximately 0.35 and 0.7 dl/g, as measured in chloroform at 25 degrees Centigrade.

* * * * *